United States Patent Office 3,149,172
Patented Sept. 15, 1964

3,149,172
TRANS 1-HALOBUTADIENES
Lawrence J. Hughes, Hitchcock, Tex., assignor to Monsanto Company, a corporation of Delaware
No Drawing. Filed June 21, 1961, Ser. No. 118,509
7 Claims. (Cl. 260—655)

The present invention relates to the preparation of isomeric mixtures of 1-halobutadienes wherein the trans isomer predominates and further to a method for converting the cis isomer of a 1-halobutadiene to the trans isomer.

It has been known for some time that 1-halobutadienes can be prepared by dehydrohalogenation of dihalobutenes with alkaline agents (U.S. 2,038,538 and 2,038,593). Little information has been available, however, as to the nature of these butadiene derivatives. Attempts to react the compounds in the Diels-Alder synthesis have been reported to be generally unsuccessful. Assumptions have been made that the trans isomers of these compounds would enter into diene synthesis reactions and that the cis isomers would be inactive in this reaction but only recently has there been any real information concerning the geometric configuration of 1-halobutadienes. Russian workers have reported (Doklady Akademii Nauk SSSR, vol. 132, No. 1, pp. 138–140, May 1960) that 1-halobutadienes prepared by alkaline dehydrohalogenation of corresponding 1,4-dihalobutenes are mixtures of the cis and trans isomers in which the latter isomer occurs only in minor proportions. This has been confirmed in the work from which the present invention stems with the exception that even smaller quantities of the trans isomers are produced by the known methods than those reported. Because of their reactivity in the diene synthesis to produce compounds leading to a whole new complex of useful polymerizable materials, the trans isomers of 1-halobutadienes are attractive chemical compounds. It would be desirable, therefore, to provide a method for producing these isomers directly in predominating quantities and also to be able to convert the available cis isomers to the more useful trans isomers. These and other related desirable ends constitute the principal objects of the present invention.

According to the invention, a mixture of the cis and trans isomers of 1-halobutadienes in which the trans isomer predominates is produced directly by thermal dehydrohalogenation of dihalobutenes at temperatures from about 400° C. to about 800° C. or by heating the 1-halobutadiene product from the alkaline dehydrohalogenation of dihalobutenes at temperatures from about 400° C. to about 800° C. In another embodiment of the invention, the pure or relatively pure cis isomer of a 1-halobutadiene can be converted to the trans isomer by heating it at temperatures from 400°–800° C. At maximum conversion, the resulting product is an equilibrium mixture of the isomers in which the trans isomer predominates by at least 2 to 1.

The following examples are presented to illustrate the invention but are not to be construed as limiting it in any manner whatsoever.

Example 1

A mixture of approximately 85% 1,4-dichlorobutene-2 and 15% 3,4-dichlorobutene-1 was subjected to thermal decomposition. The reactor employed was a 43-mm. I.D. quartz tube 23 inches long fitted with a 6-mm. O.D. thermowell and filled with 8–12 mesh porous silicon carbide. It was wrapped with Nichrome ribbon and covered with high-temperature pipe insulation.

The reactor was heated to a temperature of about 600° C. while a stream of dry nitrogen was passed through the tube. When the temperature had become stabilized, the dichlorobutene from a vaporizer maintained at 100° C. and nitrogen as a carrier gas were passed through the tube at a rate to give a residence time of about one second. The effluent gas was conducted through a water scrubber, a Dry Ice trap and a liquid nitrogen trap. The contents of the traps and any organic phase from the water scrubber were combined and fractionated to recover a 1-chlorobutadiene-1,3 fraction boiling at 66.5° C. to 67.5° C. at atmospheric pressure.

A portion (42.5 g.–0.485 mol) of the 1-chlorobutadiene-1,3 as prepared above was charged to a reaction flask and heated to about 47° C. To this was added with stirring 31.0 g. (0.316 mol) of maleic anhydride over a period of about 45 minutes during which the temperature was maintained at 47–51° C. by control of the exothermic heat of reaction. After addition of the maleic anhydride was completed, the reaction was continued at this temperature for about 1.5 hours. Thereafter, the reaction mixture was stirred overnight at room temperature. Benzene (25 ml.) was added to the flask, the resulting mixture was cooled to about 8° C., and then filtered to recover 47.8 g. of the crystalline product which was identified by its melting point (127–9° C. dec.) as predominantly 3-chloro-4 - cyclohexene-1,2-dicarboxylic anhydride, the adduct formed from trans 1-chlorobutadiene-1,3 and maleic anhydride.

Subsequently, another portion of the 1-chlorobutadiene-1,3 used in preparing the above adduct was analyzed by means of an infrared spectrophotometer and found to contain approximately 60% of the trans isomer.

Example 2

Solid sodium hydroxide (88 g.) and 1,4-dichlorobutene-2 (20 ml.) were charged to a three-necked, 1000-ml. flask fitted with a stirrer, a dropping funnel, a condenser and a thermometer. The flask was heated to a temperature of approximately 100° C. and more 1,4-dichlorobutene-2 was added dropwise over a period of about two hours until approximately 2 mols (250 g.) had been charged. Small amounts of solid caustic were also added periodically over the total reaction period of about four hours. The product distilling over through the condenser was collected and fractionated to obtain 1-chlorobutadiene-1,3 boiling at 67–68° C.

About 26.4 g. (0.3 mol) of the 1-chlorobutadiene-1,3 was charged to a reaction flask and heated to about 48° C. and 29.4 g. (0.3 mol) of maleic anhydride was then added to the flask over a period of about 20 minutes. No evolution of heat was observed. The mixture was heated to 50° C. and held at a temperature from 45–55° C. for about one hour. Benzene (10 ml.) was added to the flask followed by n-hexane (25 ml.). The resulting mixture was cooled to 2° C. and the crystalline solid product was filtered off. The product after drying under vacuum had a melting point of 45–55° C. as compared to the melting point of 130–131° C. characteristic of the Diels-Alder adduct of 1-chlorobutadiene-1,3 and maleic anhydride and its infrared spectrum was similar to that of pure maleic anhydride.

The reaction of 1-chlorobutadiene-1,3 with maleic anhydride was again attempted using one mol of each of the reactants mixed at 45–50° C., held at this temperature for one hour, and then allowed to stand at room temperature overnight. The resulting mixture was worked up as above to recover a product having a melting point of 51–54° C. No adduct was formed indicating that the 1-chlorobutadiene-1,3 produced by alkaline dehydrochlorination consisted essentially of the cis isomer.

Further, upon analysis by means of its infrared spectrum, the 1-chlorobutadiene produced as above was shown to contain 96+% of the cis isomer.

Example 3

A sample of the 1-chlorobutadiene-1,3 of Example 2 was vaporized and passed through the packed reactor of Example 1 maintained at a temperature of about 550° C. The rate of flow of gas through the reactor was regulated so as to provide a residence or contact time therein of about 1 second. The effluent gas was condensed and reacted as in the foregoing examples with maleic anhydride. The crude product obtained had a melting point of 119–124° C. and was confirmed by its infrared spectrum to be 3-chloro-4-cyclohexene-1,2-dicarboxylic anhydride. The production of the anhydride establishes the presence of the trans isomer and clearly demonstrates the conversion of the cis isomer to the trans isomer. Infrared spectra of the effluent product from the reactor indicated that the 1-chlorobutadiene-1,3 recovered after heat treatment contained 63% of the trans isomer as compared to the feed mixture which was determined to be substantially all cis isomer when analyzed by the same method (96+%).

Example 4

A sample consisting of about 99% of 1,4-dichlorobutene-2 was subjected to thermal dehydrochlorination in the apparatus employed in Example 1 at a temperature of about 600° to 620° C. and a residence time of about 0.9 second. An infrared analysis of the 1-chlorobutadiene product recovered in the manner described in Example 1 showed it to contain 68% of the trans isomer and 32% of the cis isomer.

The invention is not to be considered as limited to the specific materials and conditions set forth in the examples. For instance, while the process of the invention has been described in connection with the production of the trans isomer of 1-chlorobutadiene-1,3, this process is equally applicable in the preparation of the trans isomer of other 1-halobutadienes, e.g., 1-bromobutadiene and 1-iodobutadiene.

Likewise, conditions for thermal dehydrohalogenation of the dihalobutenes to produce the isomeric mixtures of the 1-halobutadienes in which the trans isomer predominates can be varied considerably. Any temperature in the range from about 400° to about 800° C. can be employed. For practical yields, however, temperatures should not be lower than about 550° and for optimum yields, the preferred temperatures are those in the range from about 600° to about 700° C.

Residence time or contact time, i.e., the time during which the dihalobutene is maintained in the reaction zone at reaction temperature, can vary from about 0.1 second to about 5 seconds but preferably the introduction of vaporized feed is controlled at a rate to provide a residence time of about 0.9 to 1 second.

Any of the isomers, the 1,4-dihalo-2-butenes or the 3,4-dihalo-1-butenes or a mixture of these isomers in any proportions can be subjected to thermal dehydrohalogenation to produce a mixture of the cis and trans isomers of the corresponding 1-halobutadiene in which the trans isomer predominates.

The thermal dehydrohalogenation may be carried out in a tubular reactor of porcelain, silica or any other refractory non-catalytic material capable of withstanding the required temperatures as well as in the quartz reactor exemplified. Also, the reactor need not be packed but may be used empty. If a packed reactor is used, any type of inert finely divided material of high surface area can be used as the packing. Other suitable materials in addition to the silicon carbide mentioned in the examples include quartz or porcelain chips, ground glass and the like.

Similarly, conditions for converting the cis isomer to the trans isomer can be varied considerably. Such conditions are very similar to those applicable for the thermal dehydrohalogenation of the dihalobutenes to yield the 1-halobutadienes. Suitable temperatures for the conversion are those in the range from about 400° C. to about 800° C. with temperatures from about 500° to about 600° C. being preferred. Residence time, i.e., the time during which the cis isomer or mixture containing the cis isomer is held at the conversion temperature in the reaction zone, may vary from 0.1 to 5 seconds with a time of 1–2 seconds being preferred. The reactor employed may be an empty one or one packed with finely divided inert materials such as described above for the thermal dehydrohalogenation process. Also, the reactor may be fabricated from the same materials as those used for the dehydrohalogenation process.

What is claimed is:

1. A process for the production of mixtures of the isomers of 1-halobutadienes in which the trans isomer predominates over the cis isomer which comprises subjecting a material chosen from the group consisting of the 1,4-dihalo-2-butenes, the 3,4-dihalo-1-butenes, and mixtures thereof to thermal dehydrohalogenation at temperatures in the range from about 400° C. to about 800° C. and residence times from about 0.1 to about 5 seconds.

2. A process for the production of mixtures of the isomers of 1-chlorobutadiene-1,3 in which the trans isomer predominates over the cis isomer which comprises passing a material chosen from the group consisting of 1,4-dichlorobutene-2, 3,4-dichlorobutene-1, and mixtures thereof through a reaction zone packed with an inert finely divided material of high surface area heated to a temperature in the range from about 400° C. to about 800° C. at a rate such that the residence time in the reaction zone is from about 0.1 to about 5 seconds.

3. A process for the production of mixtures of the isomers of 1-chlorobutadiene-1,3 in which the trans isomer predominates over the cis isomer which comprises passing 1,4-dichlorobutene-2 through a reaction zone packed with finely divided silicon carbide and heated to a temperature in the range from about 600° to about 700° C. at a rate such that the residence time in the reaction zone is from about 0.9 to about 1 second.

4. A process for the production of mixtures of the isomers of 1-chlorobutadiene-1,3 in which the trans isomer predominates over the cis isomer which comprises passing 3,4-dichlorobutene-1 through a reaction zone packed with finely divided silicon carbide and heated to a temperature in the range from about 600° to about 700° C. at a rate such that the residence time in the reaction zone is from about 0.9 to about 1 second.

5. The process of converting the cis isomer of a 1-halobutadiene to the trans isomer which comprises subjecting said cis isomer to a temperature from about 400° to about 800° C. for a period from about 0.1 to about 5 seconds.

6. The process of converting the cis isomer of 1-chlorobutadiene-1,3 to the trans isomer which comprises subjecting said cis isomer to a temperature in the range from about 500° to about 600° C. for a period from about 1 to about 2 seconds.

7. The process of converting the cis isomer of 1-chlorobutadiene-1,3 to the trans isomer which comprises passing said cis isomer through a reaction zone packed with an inert finely divided material of high surface area and heated to a temperature from about 500° to about 600° C. at a rate such that the residence time in the reaction zone is from about 1 to about 2 seconds.

References Cited in the file of this patent

UNITED STATES PATENTS 2,391,827    Hearne et al. _____ Dec. 25, 1945